Aug. 26, 1969    G. W. ELDER    3,462,998
INERTIAL PUMP SEISMOMETER
Filed May 18, 1966    2 Sheets-Sheet 1

INVENTOR.
GEORGE W. ELDER
BY
Knox & Knox

United States Patent Office 3,462,998
Patented Aug. 26, 1969

3,462,998
INERTIAL PUMP SEISMOMETER
George W. Elder, 925 Rosecrans,
San Diego, Calif. 92106
Filed May 18, 1966, Ser. No. 551,111
Int. Cl. G01n 9/18
U.S. Cl. 73—71.2      6 Claims

ABSTRACT OF THE DISCLOSURE

An inertial pump seismometer in which an inertial mass drives opposing diaphragms closing the ends of a hollow body with a restricted passage and a fluid which is accelerated through said passage on movement of the body relative to the inertial mass, driving a float in the restricted passage. An electro-sensing unit records the float movement to indicate the magnitude of the shock.

---

The present invention relates to measuring instruments and specifically to an inertial pump seismometer. The instrument has a body which is firmly mounted on a foundation in which the vibrations of interest occur, the body having a pair of fluid filled chambers closed by diaphragms and connected by a restricted passage. An inertial mass is coupled to the diaphragms to cause the fluid to move between the chambers in response to vibrations, the fluid flow being greatly accelerated in the restricted passage. Within the passage is a neutrally bouyant float which moves with the fluid flow and carries signal producing means from which the required measurements are obtained. By placing the sensing means, which is the float, in the restricted passage where the fluid flow is accelerated, the effects of vibration on the fluid are greatly amplified and therefore more easily measured.

There are many different types of vibration sensing instruments in present use, or proposed, which utilize a suspended inertial mass, some of these incorporating fluid damping with various diaphragm arrangements. My U.S. Patent No. 3,023,612, entitled Hydraulic Seismometer, discloses an instrument in which an inertial mass displaces fluid to drive pistons coupled to a swinging arm, from which measurements are taken. The instrument described herein is distinct from such prior art instruments in that is has a sealed fluid system with the sensitive mechanism fully enclosed and protected, together with the high initial amplification factor incorporated in a very simple mechanism.

The structure of the seismometer is illustrated in the drawings, in which.

Similar characters of reference indicate similar or identical elements and portions throughout the specification and throughout the views of the drawing.

Figure 1:
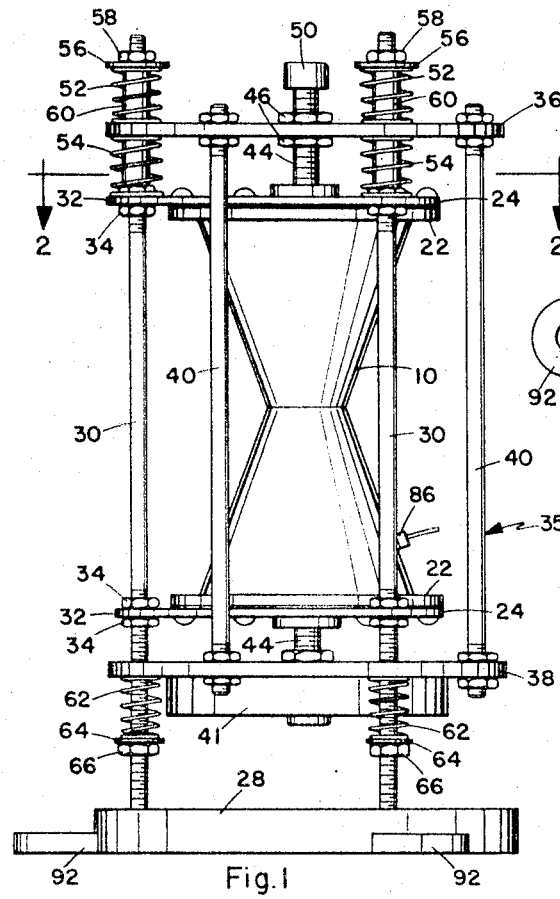
FIGURE 1 is a side elevation view of the complete instrument.
Figure 3:
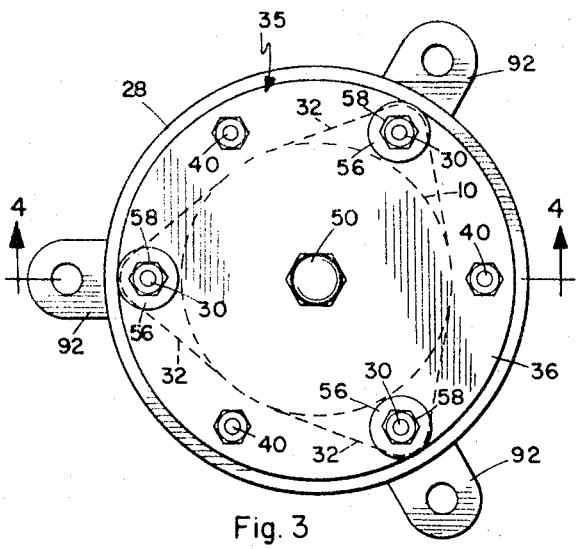
FIGURE 3 is a top plan view of the instrument.
Figure 2:
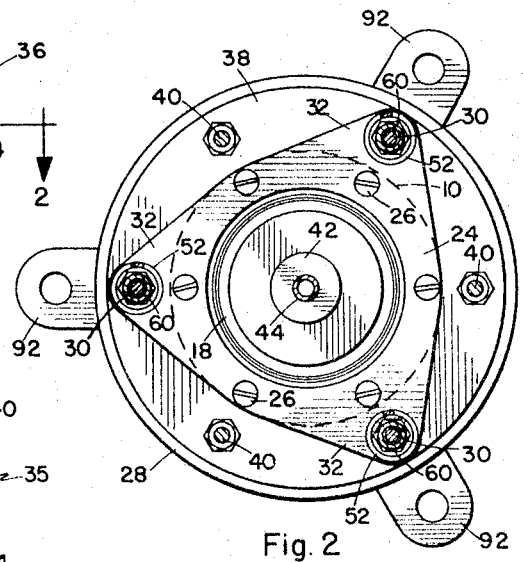
FIGURE 2 is a sectional view taken on line 2—2 of FIGURE 1.
Figure 5:
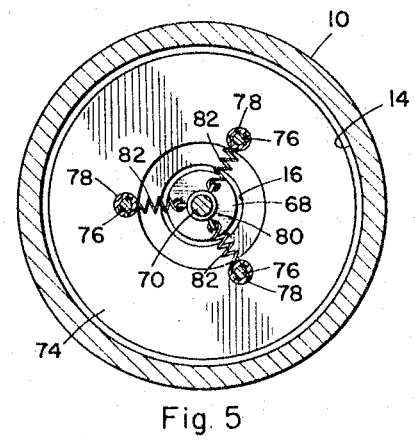
FIGURE 5 is a further enlarged sectional view taken on line 5—5 of FIGURE 4.
Figure 4:
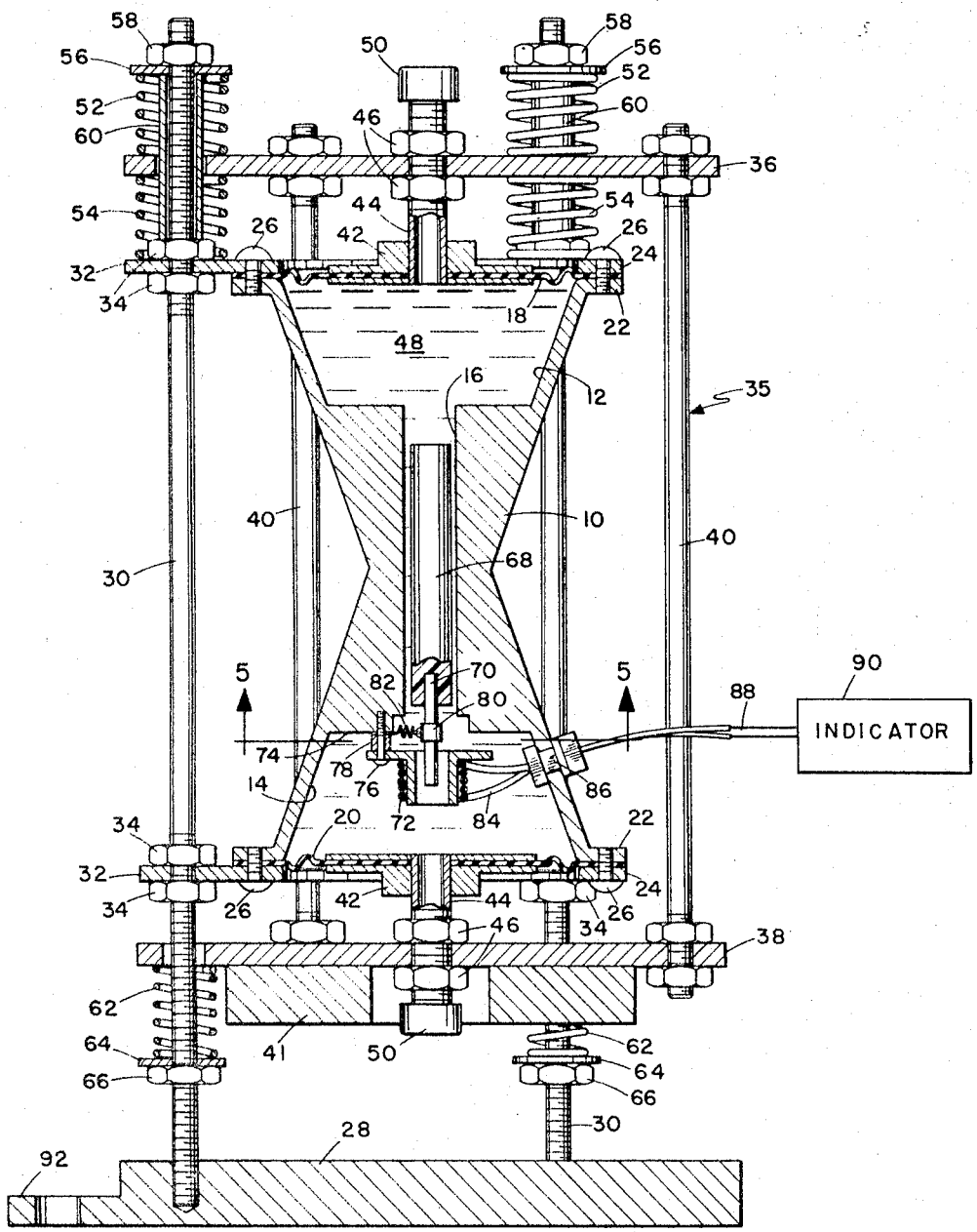
FIGURE 4 is an enlarged sectional view taken on line 4—4 of FIGURE 3.

For simplicity the seismometer is shown and described as set up to sense vibrations in a vertical direction, but it should be understood that the instrument can be mounted with its axis of sensitivity in any required direction.

The seismometer has a body 10 having large chambers 12 and 14 at opposite ends thereof, with a narrow connecting passage 16 between the chambers. Body 10 is illustrated as a unitary double conical element, but could be of straight cylindrical form, or other cross sectional shape, or be built up in any suitable manner. Chamber 12 is closed at its outer end by a diaphragm 18 and chamber 14 is closed by a similar diaphragm 20. Each diaphragm is held in place against an end flange 22 on body 10 by a retaining ring 24, which is secured by screws 26 or similar means. Gaskets or other sealing means may be used if necessary.

The body 10 is fixed above a base 28 by means of upright posts 30 which pass through extended lug portions 32 of retaining rings 24. Posts 30 are shown threaded with the retaining rings 24 firmly secured by nuts 34, but locking collars or similar means could be used.

Slidably mounted on the posts 30 is a frame 35 comprising two end plates 36 and 38 fixed together by the rods 40, with the end plate 36 spaced above body 10 and end plate 38 spaced below the body. An inertial mass 41 is secured to the underside of end plate 38 in any suitable manner. Secured to diaphragm 18 is a boss 42 from which a hollow filler stem 44 extends through end plate 36 and is secured thereto by nuts 46, the hollow stem opening into chamber 12 and facilitating filling of the body interior with fluid 48, the outer end of said stem being sealed with an end cap 50. Diaphragm 20 is connected to end plate 38 in a similar manner, the hollow stem in this instance allowing draining of the fluid when necessary. End plate 36 is held on each post 30 between compression springs 52 and 54, the springs being retained by a washer 56 and nut 58 on the upper end of each post. Sleeves 60 are fitted over the upper portions of posts 30 to provide smooth sliding guides for end plate 36. End plate 38 rests on compression springs 62 held by washers 64 and nuts 66 on the lower portions of posts 30. Adjustment of nuts 66 will raise or lower the frame 35 slightly to neutralize the diaphragms 18 and 20. Springs 62, in effect, compensate for the weight of the frame 35 and inertial mass and allow springs 52 and 54 to support the inertial mass 41 and end plate in such a position that the diaphragms 18 and 20 may be adjusted to a relaxed neutral position when the instrument is at rest. The lower ends of posts 30 may be sleeved if necessary, or any suitable type of low friction sliding bearings may be used at the upper and lower ends.

Inside passage 16 is a float 68 which fits closely in the passage but is freely axially slidable, the float having a bar type permanent magnet 70 fixed in the lower end thereof. The combined weight of float 68 and magnet 70 is substantially equal to an equal volume of the fluid 48. In other words the float unit has as near as possible neutral buoyancy in the fluid and substantially the same effective specific gravity as the fluid. In chamber 14 is a cylindrical inductive coil 72 coaxial with passage 16, the coil being secured to the inner end face 74 of said chamber by screws 76 and supported on spacers 78. Magnet 70 has a collar 80 to which are attached very light centering springs 82, the ends of which may be conveniently held by screws 76. Springs 82 are intended to retain the float unit in the passage 16 without interfering unduly with its axial motion. Magnet 70 protrudes partially into the coil 72 and any motion of the magnet into or out of the coil will cause an electrical current to flow through the coil in proportion to the penetration of the magnet, the principle being well known. Electrical leads 84 from coil 72 are brought out of the body 10 through a fluid tight connector 86, from which connections 88 are made to an indicator 90. The indicator can be a simple meter, an oscilloscope, a graphic recorder, or other such means normally used for indicating vibrations.

The instrument is mounted on a suitable support or foundation in which the vibration of interest will occur. Base 28 is provided with feet 92 to facilitate firm attachment. Any vibrations in the general direction parallel to the axis of body 10 will cause the body, together with base 28, to vibrate in an axial direction. The inertial mass 41 resists any sudden motion and causes a sliding motion of the frame 35 relative to the body. This results in an inward deflection of one diaphragm and an outward deflection of the other diaphragm, the deflections being equal since both diaphragms are securely connected to the end plates of the rigid frame 35. Thus the internal volume of the body cavities remains constant. The inward deflection, say of diaphragm 18, reduces the volume of chamber 12 and causes a flow of fluid through passage 16 to chamber 14, which has increased in volume by a like amount by the outward deflection of diaphragm 20. Since the float 68 is neutrally buoyant, its inertia is effectively the same as that of the fluid 48, so the float moves with the fluid in accordance with the velocity and linear displacement of the fluid in passage 16. Due to the difference between the area of the diaphragm and the small cross sectional area of passage 16, the transfer flow of fluid through the passage will be greatly accelerated. As illustrated, the diameter of either diaphragm is about five times the diameter of passage 16, making the ratio of areas about 25 to 1. Thus the flow velocity and linear displacement of fluid through the passage will be about 25 times that occurring in the chambers. Any suitable ratio of areas may be used, depending on the particular use of the instrument. The increased motion of float 68 carrying magnet 70 greatly amplifies the current generated in coil 72 and increases sensitivity to received impulses of low intensity.

The sealed, constant volume fluid system is positive and consistent in response to vibration and allows operation of the instrument for long periods with a minimum of attention. By utilizing the upper stem 44 as a filler inlet the body can be completely filled, eliminating the possibility of undesirable air bubbles. The instrument can be mounted with the axis of sensitivity in any desired direction, the neutrally buoyant float being unaffected by gravitational effects and the centering springs 82 preventing the float from drifting into either chamber. The fluid acts as a lubricant to reduce friction of the float in the restricted passage. Continuous response is provided, no settling time being required as with some types of seismometers. Springs 52, 54 and 62 can be chosen to provide the proper resilient support for the inertial mass for the particular range of vibration intensities to be measured. The instrument is not affected by temperature changes, since the clearances of the moving parts are not critical and can be large, while any expansion or contraction of the fluid is accommodated by both diaphragms equally.

It is understood that minor variation from the form of the invention disclosed herein may be made without departure from the spirit and scope of the invention, and that the specification and drawings are to be considered as merely illustrative rather than limiting.

I claim:
1. A seismometer comprising:
   a base for attachment to a supporting surface;
   a body fixed on said base;
   said body having fluid tight chambers having openings at opposite ends of said body with a restricted passage between said chambers;
   resilient diaphragms secured to opposite ends of said body and sealing said openings in said chambers;
   a fluid filling said chambers and restricted passage;
   a float, neutrally buoyant in said fluid, axially slidably mounted in said passage;
   an inertial mass coupled to at least one of said diaphragms;
   and means to measure the motion of said float axially in said passage;
   said inertial mass being coupled to both of said diaphragms and including spring means coupled to said inertial mass to support said inertial mass in such position that said diaphragms are in a relaxed neutral position when the seismometer is at rest.
2. A seismometer according to claim 1 and including a rigid frame on which said inertial mass is secured, said frame being mounted on said base for axial sliding motion relative to said body.
3. A seismometer according to claim 2, wherein at least one of said diaphragms has a filler stem fixed thereto and connected to said frame, said stem being hollow and communicating with the interior of said body.
4. A seismometer according to claim 1 and including posts extending from said base substantially parallel to the axis of said body;
   a frame having portions slidable on said posts;
   said inertial mass being attached to said frame;
   each of said diaphragms being connected to said frame.
5. A seismometer according to claim 4 wherein said spring means are springs on said posts and engaging said portions of the frame.
6. A seismometer according to claim 4 wherein said portions include end plates and each of said diaphragms has a stem fixed thereto and connected to the adjacent end plate, at least one of said stems being hollow and communicating with the interior of said body to admit fluid, and an end cap sealing the hollow stem.

References Cited

UNITED STATES PATENTS

| 2,677,270 | 5/1954 | Sanderson | 73—515 |
| 2,764,019 | 9/1956 | Lindholm et al. | 73—71.2 |
| 3,008,334 | 11/1961 | Lees | 73—516 |

JAMES J. GILL, Primary Examiner

HERBERT GOLDSTEIN, Assistant Examiner

U.S. Cl. X.R.

73—516